(12) United States Patent
McLeod

(10) Patent No.: US 11,120,703 B2
(45) Date of Patent: Sep. 14, 2021

(54) METHOD OF TRAINING FOR WELDING THROUGH VIRTUAL REALITY

(71) Applicant: Sherman McLeod, Philadelphia, PA (US)

(72) Inventor: Sherman McLeod, Philadelphia, PA (US)

( * ) Notice: Subject to any disclaimer, the term of this patent is extended or adjusted under 35 U.S.C. 154(b) by 233 days.

(21) Appl. No.: 15/960,201

(22) Filed: Apr. 23, 2018

(65) Prior Publication Data
US 2019/0325774 A1   Oct. 24, 2019

(51) Int. Cl.
```
G09B 9/00      (2006.01)
G09B 19/24     (2006.01)
G09B 5/06      (2006.01)
G09B 19/00     (2006.01)
G02B 27/01     (2006.01)
```

(52) U.S. Cl.
CPC .............. *G09B 9/00* (2013.01); *G02B 27/017* (2013.01); *G09B 5/06* (2013.01); *G09B 19/003* (2013.01); *G09B 19/24* (2013.01)

(58) Field of Classification Search
None
See application file for complete search history.

(56) References Cited

U.S. PATENT DOCUMENTS

| | | | |
|---|---|---|---|
| 9,724,787 B2 | 8/2017 | Becker et al. | |
| 2008/0038702 A1* | 2/2008 | Choquet | G09B 19/0038 434/260 |
| 2014/0017642 A1* | 1/2014 | Postlethwaite | G09B 9/00 434/234 |
| 2015/0056584 A1* | 2/2015 | Boulware | B23K 9/32 434/234 |
| 2015/0170539 A1* | 6/2015 | Chica Barrera | G09B 9/00 434/234 |
| 2015/0235565 A1* | 8/2015 | Postlethwaite | G09B 19/24 434/234 |
| 2015/0248845 A1* | 9/2015 | Postlethwaite | G09B 19/24 434/234 |
| 2015/0325153 A1 | 11/2015 | Albrecht | |
| 2015/0375323 A1* | 12/2015 | Becker | G09B 19/24 700/160 |

(Continued)

FOREIGN PATENT DOCUMENTS

WO    WO2012082105 A1    6/2012

*Primary Examiner* — Nathan Hillery

(57) ABSTRACT

In a method of training for welding through virtual reality, a virtual reality (VR) headset is provided, along with a processing device and at least one welding training tool, wherein the processing device is communicably coupled with the virtual reality headset and the at least one welding training tool such as a hand-held welding device designed to simulate a real-world welding experience in virtual reality. A virtual welding environment is displayed through the VR headset, and user input such as motion tracking is received through the at least one welding training tool. The user input is evaluated through the processing device to evaluate user welding performance. Various user feedback devices such as sound and scent generation may be implemented in order to accurately simulate a welding procedure, in addition to eye tracking. Various welding scenarios may be completed by the user to train for welding in the virtual welding environment.

11 Claims, 6 Drawing Sheets

(56) References Cited

U.S. PATENT DOCUMENTS

| | | | |
|---|---|---|---|
| 2015/0375327 A1* | 12/2015 | Becker | G06T 1/00 |
| | | | 345/440 |
| 2016/0155361 A1* | 6/2016 | Peters | G09B 7/00 |
| | | | 434/234 |
| 2016/0267806 A1* | 9/2016 | Hsu | B23K 9/32 |
| 2016/0343268 A1* | 11/2016 | Postlethwaite | G09B 19/24 |
| 2017/0046974 A1* | 2/2017 | Becker | G09B 19/003 |
| 2017/0046975 A1* | 2/2017 | Becker | G09B 9/00 |
| 2017/0046976 A1* | 2/2017 | Becker | B23K 9/32 |
| 2017/0046977 A1* | 2/2017 | Becker | B23K 9/0953 |
| 2017/0046982 A1* | 2/2017 | Wallace | G09B 19/24 |
| 2017/0200384 A1* | 7/2017 | Albrecht | G09B 9/00 |
| 2017/0249857 A1 | 8/2017 | Bauer | |
| 2017/0249858 A1 | 8/2017 | Boettcher et al. | |
| 2018/0102061 A1* | 4/2018 | Beeson | B23K 9/0956 |
| 2018/0126476 A1* | 5/2018 | Meess | B23K 9/1087 |
| 2018/0130376 A1* | 5/2018 | Meess | A42B 3/30 |
| 2018/0130377 A1* | 5/2018 | Meess | B23K 9/1093 |
| 2018/0193853 A1* | 7/2018 | Fateh | A63F 13/5255 |
| 2018/0357923 A1* | 12/2018 | Daniel | G09B 19/24 |
| 2019/0325779 A1* | 10/2019 | Meess | G09B 19/00 |

* cited by examiner

METHOD OF TRAINING FOR WELDING THROUGH VIRTUAL REALITY

FIELD OF THE INVENTION

The present invention relates generally to virtual reality. More particularly, the present invention relates to using virtual reality equipment to train for welding.

BACKGROUND OF THE INVENTION

Virtual reality (VR) is a computer-generated scenario that simulates a realistic experience. Immersive digitally rendered environments can be similar to the real world in order to create a lifelike experience grounded in reality or science fiction. Augmented reality systems may also be considered a form of VR that layers virtual information over a live camera feed into a headset, or through a smartphone or tablet device.

Current VR technology most commonly uses virtual reality headsets or multi-projected environments, sometimes in combination with physical environments or props, to generate realistic images, sounds and other sensations that simulate a user's physical presence in a virtual or imaginary environment. A person using virtual reality equipment is able to "look around" the artificial world, move around in it, and interact with virtual features or items. The effect is commonly created by VR headsets consisting of a head-mounted display with a small screen in front of the eyes, but can also be created through specially designed rooms with multiple large screens.

VR systems that include transmission of vibrations and other sensations to the user through a game controller or other devices are known as haptic systems. This tactile information is generally known as force feedback in medical, video gaming and military training applications. Virtual reality has many applications in a variety of fields, most commonly used in entertainment applications such as gaming and 3D cinema.

Welding is a fabrication or sculptural process that joins materials, usually metals or thermoplastics, by causing fusion, which is distinct from lower temperature metal-joining techniques such as brazing and soldering, which do not melt the base metal. In addition to melting the base metal, a filler material is typically added to the joint to form a pool of molten material (the weld pool) that cools to form a joint that is usually stronger than the base material. Pressure may also be used in conjunction with heat, or by itself, to produce a weld. Welding also requires a form of shield to protect the filler metals or melted metals from being contaminated or oxidized. Although less common, there are also solid state welding processes such as friction welding in which metal does not melt.

One of the most common types of arc welding is shielded metal arc welding (SMAW); it is also known as manual metal arc welding (MMA) or stick welding. Electric current is used to strike an arc between the base material and consumable electrode rod, which is made of filler material (typically steel) and is covered with a flux that protects the weld area from oxidation and contamination by producing carbon dioxide ($CO2$) gas during the welding process. The electrode core itself acts as filler material, making a separate filler unnecessary.

The process is versatile, making it well suited to shop jobs and field work. An operator can become reasonably proficient with a modest amount of training and can achieve mastery with experience. Other types of welding include gas metal arc welding (GMAW), flux-cored arc welding (FCAW), gas tungsten arc welding (GTAW) or tungsten inert gas (TIG) welding, and submerged arc welding (SAW).

Each type of welding is a process that must be learned by the user over a period of many training sessions. Welding equipment is expensive, often prohibitively so for an average person to purchase or rent. The present invention seeks to provide a digital platform through which a user may perform a wide variety of practice and test scenarios and activities for welding through virtual reality. The user may be provided through the present invention various training courses for welding through which to progress to hone their skills and evaluate their performance, as well as a variety of secondary activities related to welding such as, but not limited to, practicing welding-related mathematical exercises, blueprint reading, adding component layouts, grinding surfaces, welding assemblies and subassemblies, welding machine setu-ups, weld filler materials specifications, and various material properties to be welded.

DETAIL DESCRIPTIONS OF THE INVENTION

Figure 1:
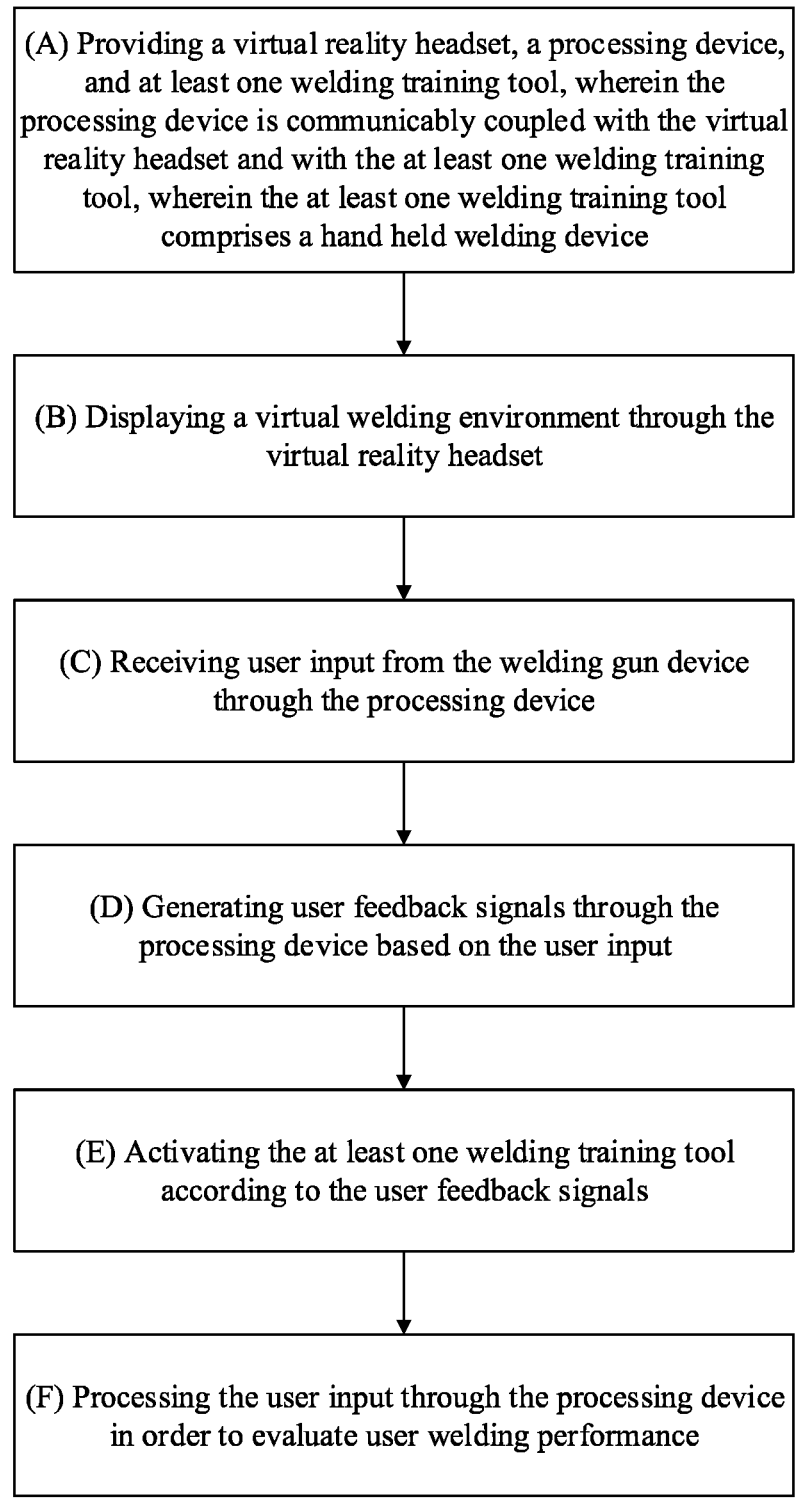
FIG. 1 is a stepwise flow diagram illustrating the general method of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances and should not be considered to be limiting to the scope of the present invention as a whole.

The present invention is a method of training for welding through virtual reality. More particularly, the present invention is an expert method with no need for an instructor with experience. The present invention utilizes computer-executable instructions stored on a non-transitory computer-readable medium to interface with hardware components in order to facilitate the purpose of the present invention. The present invention may be generally embodied as a software program, application or combination of applications written in any relevant programming language or application creation tool, and may be carried out through various electronic hardware, circuitry or other components. The user wears a virtual reality headset through which the user experiences a welding training environment and other secondary applications. The software of the present invention may be run from a mobile device such as a cell phone, or from a laptop or desktop personal computer or other device which is communicably coupled with the virtual reality headset. Furthermore, the user is provided with an electronic user interface implement resembling a welding gun or similar device, and/or other relevant user input devices, in order to interact with the present invention. Through this combination of hardware and software, the user is afforded the opportunity to experience a variety of welding scenarios and other situations in order to increase their welding proficiency from beginner to expert level.

The present invention may utilize any form of VR commercially available on the market or new VR technology as appropriate. The present invention may be utilized in conjunction with a variety of physical welding training tools, such as welding guns, stingers, foot pedals, and any other types of welding apparatus available for any type of welding. The present invention may be used to gain experience in types of welding such as, but not limited to, shielded metal arc welding (SMAW), gas metal arc welding (GMAW), flux-cored arc welding (FCAW), submerged arc welding (SAW), gas tungsten arc welding (GTAW), or other types of welding, such as machine welding and more.

The physical equipment utilized in the present invention in conjunction with the VR system may be integrated into the system so that various aspects may be implemented, such as, but not limited to: vibration, sound, visuals, perception, spatial dimensions, machine setup, welding mathematics, blueprint reading, and fabrication of two or more components in any shape (such as small components being welded to large structural steel assemblies and subassemblies). These aspects may be implemented as part of the design of the system to facilitate the experience of individuals who desire to learn welding processes and other aspects of welding, including, but not limited to, machine changeover, set-up troubleshooting, welding, OSHA safety, and more. The present invention is intended to simulate all aspects of the welding process. The present invention allows individuals to sharpen their welding skills such that aspects such as their straightness, visual or other sensations such as smell, sound, or tactile feedback closely simulates an actual experience of welding in the real world.

The present invention may include the use of and training in different types of welding materials, joints, shapes, positions, and other relevant welding variables. The present invention may include welding training for all positions of welding in the following positions: 1G, 2G, 5G and 6G for pipe, 1F, 2F, 3F, and 4F for fillet welds, 1G, 2G, 3G, and 4G for plates, or any combination of beveled or straight edges in combination with any subassembly or complete assembly of any fabricated plates, pipes, tubing, or any other surfaces for all types of steel (including, but not limited to: mild steel, stainless steel, and other types of steel), aluminum, copper, brass, or other materials. The present invention may also cover the use of thin gauge materials or thicker gauge materials to be welded in any combination.

The present invention adapts actual welding attachments so that the user will experience in a simulated environment weld processes that correspond to physical welding environments in the real world. The physical welding environment may be simulated so that the user may perform welding processes according to standards such as AWS, American Petroleum, military or other standards. The welding angle, speed, puddle, or full fusion as well as various weld patterns may be allowed to be utilized in a freestyle format by the user for learning how to weld.

Visuals displayed to the user through the VR headset are immersive and designed to teach and engage users with respect to such subjects as blue print reading, welding joints, assembly, contextual math, troubleshooting, and more. Physical equipment provided for use with the present invention should include a device resembling a real-world in-house welding tool which is capable of pairing with all VR platforms. Furthermore, it is desired that the welding tool be capable of vibration, motion tracking, and/or eye tracking to develop technique. Further physical equipment may be utilized for producing sounds and smells such as those experienced during real-world welding processes to engage the user and develop an immersive atmosphere.

In particular, as shown in FIG. 1, a VR headset is provided, along with a processing device, and at least one welding training tool (Step A), and a virtual welding environment is displayed through the VR headset (Step B). The processing device is communicably coupled with the virtual reality headset and with the at least one welding training tool through wired or wireless connections as appropriate. Furthermore, the at least one welding training tool comprises a hand-held welding device. The hand-held welding device may be understood to be the primary user interface through which the user performs welding processes through the present invention. In some embodiments, the hand-held welding device may be one or more tools for automated or semiautomated welding such as a sub-arc welding tool. Preferably, the hand-held welding device is capable of motion tracking. Thus, movement of the hand-held welding device in the user's hands is captured and translated into a digital representation of the hand-held welding device in the virtual welding environment. The virtual welding environment may be understood to be any virtual environment rendered through the VR headset which may facilitate welding training. In general, the virtual welding environment may be understood to be a representation of a virtual welding scenario, in which the user may complete welding tasks in the virtual environment.

User input is received from the hand-held welding device through the processing device (Step C). The user input preferably includes motion tracking data as the user moves manipulates the hand-held welding device while performing welding processes in the virtual welding environment. Additional user input may be received from the hand-held welding device, such as, but not limited to, input from button presses or switch actuation, or any other input means. In some embodiments, user input may also be received through the processing device. For example, the user may input selections for materials, welding type or other variables through a user input device communicably coupled to the processing device such as a keyboard, mouse or touchscreen.

In the preferred embodiment, user feedback signals are generated through the processing device based on the user input (Step D). Subsequently, the at least one welding training tool is activated according to the user feedback signals (Step E). In some embodiments, the at least one welding training tool may be activated according to the user feedback signals by activating a vibration device of the at least one welding training tool to provide haptic feedback to the user. In some embodiments the at least one welding training tool may further comprise a sound generation device, a scent generation device, and/or any other devices appropriate for generating feedback in order to accurately simulate a welding environment for the user.

Finally, the user input is processed through the processing device in order to evaluate user welding performance (Step F). Specific details of the process of evaluating user welding performance are not disclosed herein, however the user input received through the hand-held welding device, corresponding to movement and activation of a virtual representation of the hand-held welding device in relation to any welding components present in the virtual welding environment, is processed according to one or more relevant algorithms or metrics in the software to evaluate the user welding performance. In some embodiments, a plurality of welding metrics is provided in the software, and the user input is compared to the plurality of metrics in order to generate a pass/fail user grade. In some embodiments, user welding performance is evaluated by generating a welding score, for example between zero and 100. Any given welding scenario may have one or multiple welding metrics unique to the scenario, and/or every welding scenario may have one or more universal welding metrics applied.

Figure 2:
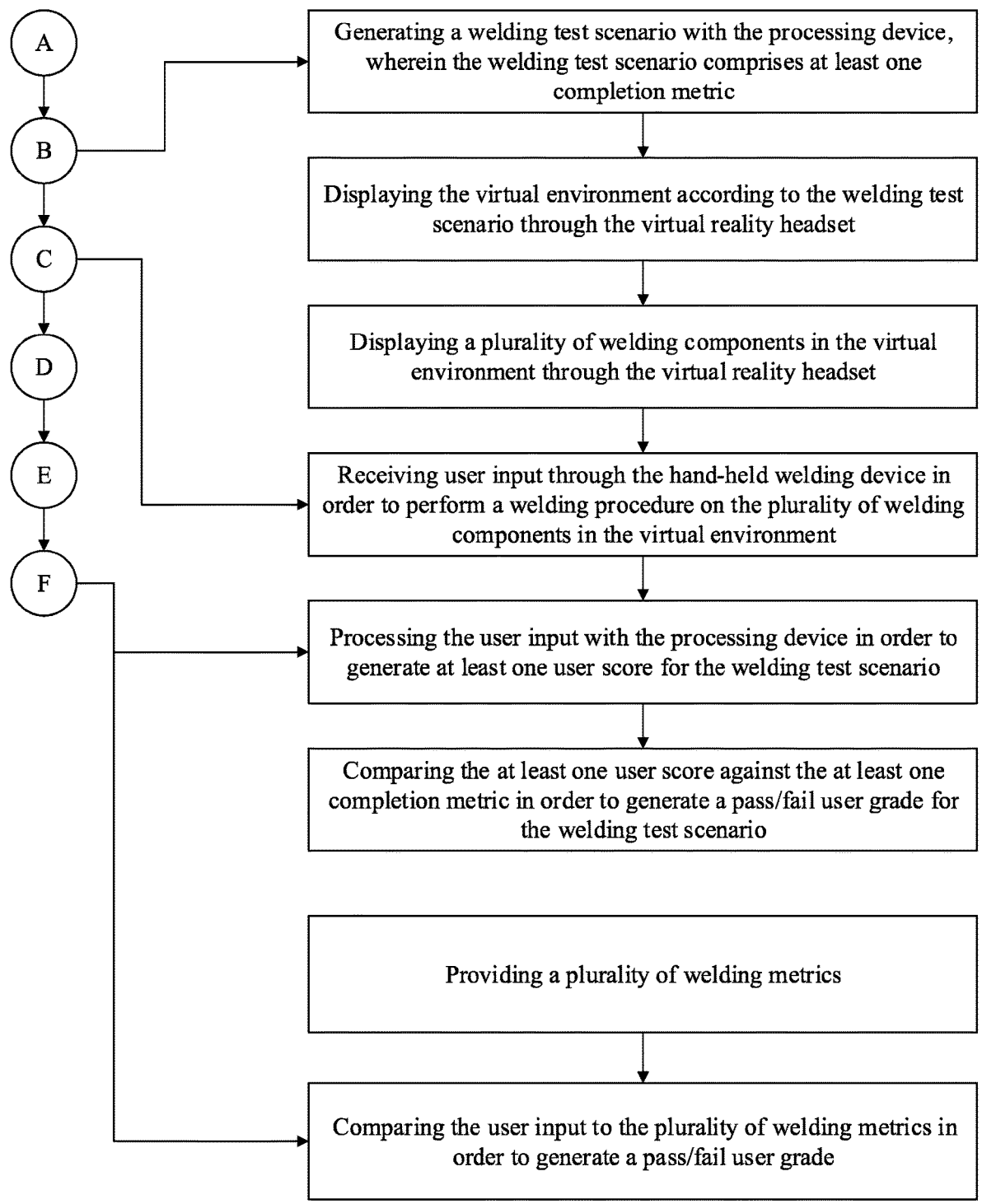
FIG. 2 is a stepwise flow diagram illustrating steps for evaluating user welding performance in accordance with some embodiments of the present invention.

In various embodiments as shown in FIG. 2, a welding test scenario may be generated with the processing device, wherein the welding test scenario comprises at least one completion metric. In some embodiments, generating a welding test scenario may mean simply to rendering all relevant parameters specific to the welding test scenario, which may have been predefined in the software. In some embodiments, generating a welding test scenario may include dynamic generation of the welding test scenario based on various parameters and/or metrics, either user-defined, random, or other. In some embodiments, the user may be tasked with welding a complete assembly within the virtual welding environment of the present invention.

The virtual environment is displayed according to the welding test scenario through the virtual reality headset, and a plurality of welding components is further displayed in the virtual environment through the virtual reality headset. User input is received through the hand-held welding device in order to perform a welding procedure on the plurality of welding components in the virtual environment, and the user input is processed with the processing device in order to generate at least one user score for the welding test scenario. The at least one user score is then compared against the at least one completion metric on order to generate a pass/fail grade for the welding test scenario.

Figure 3:
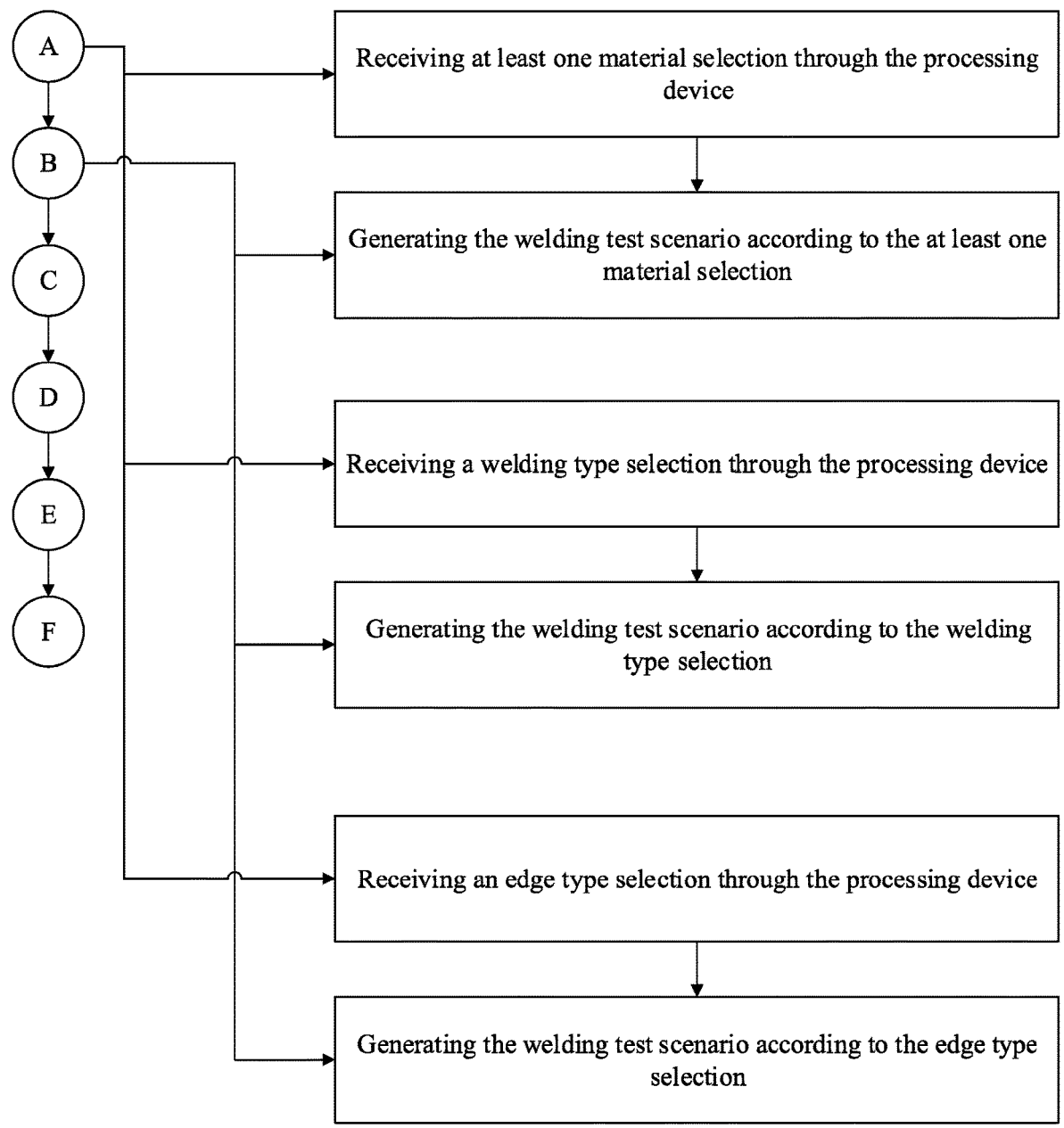
FIG. 3 is a stepwise flow diagram illustrating steps for designating various parameters for welding test scenarios in accordance with some embodiments of the present invention.

In some embodiments, the user may customize their virtual welding experience. Thus, in accordance with FIG. 3, the user may input at least one material selection through a user input device such as a mouse, keyboard or touchscreen, or through the hand-held welding device if applicable, which is received through the processing device. In various embodiments, the nature of the material selection may vary. For example, in some embodiments, the material selection may correspond to a material thickness of welding components to be welded together, such as, but not limited to, $\frac{1}{16}$ inch thickness or 2 inch thickness heavy gauge plates. Furthermore, the material selection may comprise the nature of the material to be welded together, such as, but not limited to, mild steel, stainless steel, aluminum, brass, copper, or any other weldable materials or combination of weldable materials. The material selection may further comprise one or more flat surface or rounded surface selections, beveled edge selections, straight edge selections, weld angles, or any combination of the aforementioned material selection attributes. The welding test scenario is then generated according to the at least one material selection. Furthermore, in some embodiments, a welding type selection may be received through the processing device, and the welding test scenario is generated according to the welding type selection. Similarly, in some embodiments, an edge type selection may be received through the processing device, and the welding test scenario is then generated according to the edge type selection.

Figure 4:
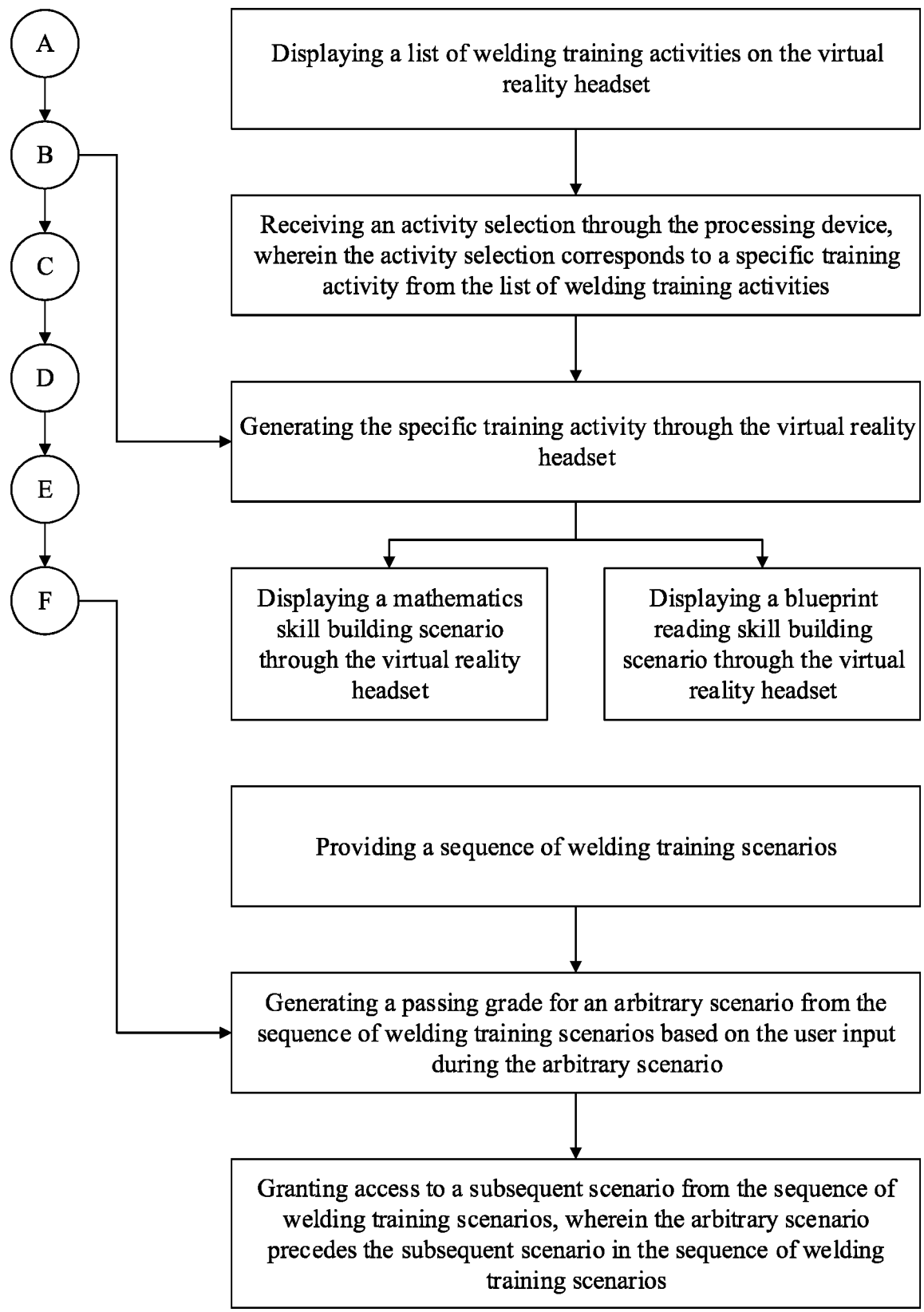
FIG. 4 is a stepwise flow diagram illustrating steps for selecting and progressing through a welding training activities and scenarios in accordance with some embodiments of the present invention.

Preferably in the present invention, the user may select from a plurality of welding training activities. The welding training activities may include, but are not limited to, welding test scenarios as previously discussed, freestyle welding scenarios, welding mathematics activities, automated machine welding such as sub-arc or other type of automated equipment, equipment setup activities, and blueprint reading activities. Thus, referring to FIG. 4, a list of welding training activities is displayed on the VR headset. An activity selection is received through the processing device, wherein the activity selection corresponds to a specific training activity from the list of welding training activities, and the specific training activity is subsequently generated through the processing device in the virtual welding environment and displayed on the VR headset. Furthermore, the present invention may provide a sequence of welding training scenarios through which the user is allowed to progress in order to augment their welding skills. Thus, a passing grade may be generated for an arbitrary scenario from the sequence of welding training scenarios based on the user input during the arbitrary scenario. Access to a subsequent scenario from the sequence of welding training scenarios is then granted to the user, wherein the arbitrary scenario precedes the subsequent scenario in the sequence of welding training scenarios. In some embodiments, the sequence of welding training scenarios may be designed according to current or future welding certifications standards, such that a user may be afforded the opportunity to procure a welding certification by progressing through a welding training program provided through the present invention.

Furthermore, a mathematics skill building scenario may be displayed through the VR headset, wherein the user may interact with the mathematics skill building scenario in order to practice relevant mathematics skills. Similarly, a blueprint reading skill building scenario may be displayed through the virtual reality headset.

Figure 5:
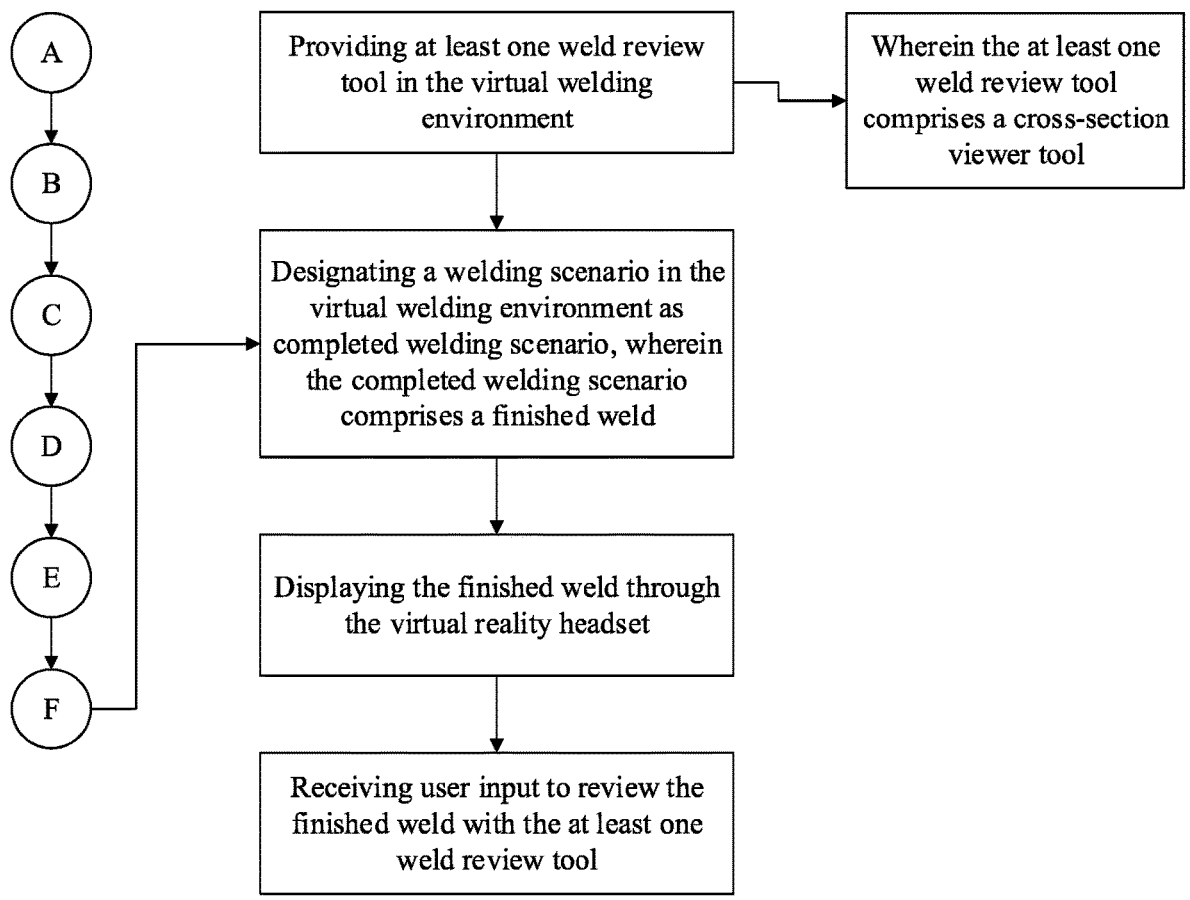
FIG. 5 is a stepwise flow diagram illustrating steps for implementing weld review tools in accordance with some embodiments of the present invention.

Preferably in the software of the present invention, the user is further provided with at least one weld review tool in the virtual welding environment as shown in FIG. 5. The at least one weld review tool may be utilized to asses their welding performance after or during a welding process in the virtual environment. Each of the at least one weld review tool may be understood to be a component or collection of components in the software which may be used to evaluate a welding performance. Thus, a welding scenario in the virtual welding environment may be designated as a completed welding scenario after the user finishes their welding performance, such that the completed welding scenario comprises a finished weld. In various embodiments, the finished weld may further be grinded in the virtual environment through the present invention. The finished weld is displayed through the VR headset, and user input may be received through the processor and/or the at least one welding training tool to review the finished weld in the virtual environment with the at least one weld review tool. In some embodiments, the at least one weld review tool comprises a cross-section viewer tool enabling the user to view cross-sections of the completed weld at any desired location and angle. Various embodiments of the present invention may comprise various other types of weld review tools as appropriate.

Figure 6:
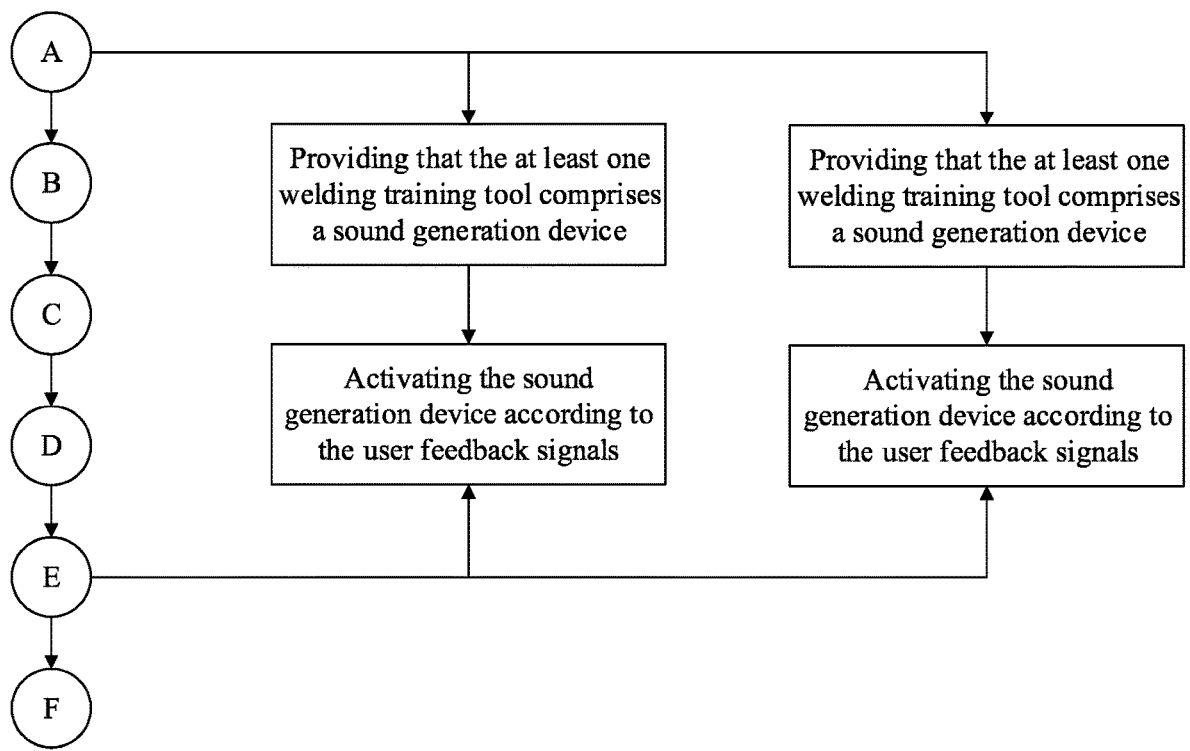
FIG. 6 is a stepwise flow diagram illustrating steps for generating user feedback in accordance with some embodiments of the present invention.

As previously mentioned, in various embodiments, the present invention may comprise various means for generating real-time user feedback in accordance with their welding performance in the virtual environment in order to accurately simulate a real-world welding experience. As such, in various embodiments of the present invention, various accessory devices may be implemented to generate real-world user feedback. Thus, in some embodiments as illustrated in FIG. 6 the at least one welding training tool may comprise a sound generation device, and the sound generation device is activated according to the user feedback signals. For example, when the user is performing a weld in the virtual environment, the sound generation device may be activated to produce welding sounds. Furthermore, in some embodiments the at least one welding training tool comprises a scent generation device, and the scent generation device may be activated during virtual welding according to the user feedback signals. The scent generation device may be any physical device which is capable of producing one or more scents according to the user feedback signals. For example, the scent generation device may comprise, but is not limited to, a smoke generator, or a fragrance machine. The at least one welding training tool may further comprise any other desired user feedback device, such as, but not limited to, a vibration generator or other devices. The sound generation device, the scent generation device, and any similar peripheral user feedback generation devices may be integrated into the VR headset, the hand-held welding device, or may be a separate component further communicatively coupled with the processing device.

Furthermore, in some embodiments, the present invention may further utilize artificial intelligence (AI) and/or machine learning to increase user skill and experience. Various user data, such as, but not limited to, user identifying data, user input data, and other relevant data may be collected and stored on an appropriate storage device. The stored user data may be analyzed through one or more AI and/or machine learning algorithms and methods. In particular, in some embodiments, at least one AI algorithm is provided. The user input is stored on a data storage device, and the user input is analyzed with the at least one AI algorithm.

In view of the foregoing disclosure, the present invention presents a method of training for welding through a combination of software and hardware enabling a user to interact with a virtual welding environment, through which the user may experience a wide variety of virtual training activities in order to gain welding experience, reduce waste, and increase quality requirements.

Although the invention has been explained in relation to its preferred embodiment, it is to be understood that many other possible modifications and variations can be made without departing from the spirit and scope of the invention as hereinafter claimed.

What is claimed is:

1. A method of training for welding through virtual reality comprises the steps of:
providing a virtual reality headset, a processing device, and at least one welding training tool, wherein the processing device is communicably coupled with the virtual reality headset and with the at least one welding training tool, wherein the at least one welding training tool comprises a hand-held welding device, a sound generation device and a scent generation device;
displaying a virtual welding environment through the virtual reality headset;
receiving user input from the hand-held welding device through the processing device;
generating user feedback signals through the processing device based on the user input;
activating the sound generation device and the scent generation device according to the user feedback signals; and
processing the user input through the processing device in order to evaluate user welding performance;
providing a sequence of virtual welding training scenarios;
generating a passing grade for an arbitrary scenario from the sequence of virtual welding training scenarios based on the user input during the arbitrary scenario;
granting access to a subsequent scenario from the sequence of virtual welding training scenarios, wherein the arbitrary scenario precedes the subsequent scenario in the sequence of virtual welding training scenarios;
providing at least one artificial intelligence (AI) algorithm;
storing the user input on a data storage device; and
analyzing the user input with the at least one AI algorithm.

2. The method of training for welding through virtual reality as claimed in claim 1 comprises the steps of:
providing a plurality of welding metrics; and
comparing the user input to the plurality of welding metrics in order to generate a pass/fail user grade.

3. The method of training for welding through virtual reality as claimed in claim 1 comprises the steps of:
generating a welding test scenario with the processing device, wherein the welding test scenario comprises at least one completion metric;
displaying the virtual environment according to the welding test scenario through the virtual reality headset;
displaying a plurality of welding components in the virtual environment through the virtual reality headset;
receiving user input through the hand-held welding device in order to perform a welding procedure on the plurality of welding components in the virtual environment;
processing the user input with the processing device in order to generate at least one user score for the welding test scenario; and
comparing the at least one user score against the at least one completion metric in order to generate a pass/fail user grade for the welding test scenario.

4. The method of training for welding through virtual reality as claimed in claim 3 comprises the steps of:
receiving at least one material selection through the processing device; and
generating the welding test scenario according to the at least one material selection.

5. The method of training for welding through virtual reality as claimed in claim 3 comprises the steps of:
receiving a welding type selection through the processing device; and
generating the welding test scenario according to the welding type selection.

6. The method of training for welding through virtual reality as claimed in claim 3 comprises the steps of:
receiving an edge type selection through the processing device; and
generating the welding test scenario according to the edge type selection.

7. The method of training for welding through virtual reality as claimed in claim 1 comprises the steps of:
- displaying a list of welding training activities on the virtual reality headset;
- receiving an activity selection through the processing device, wherein the activity selection corresponds to a specific training activity from the list of welding training activities; and
- generating the specific training activity through the virtual reality headset.

8. The method of training for welding through virtual reality as claimed in claim 1 comprises the steps of:
- displaying a mathematics skill building scenario through the virtual reality headset.

9. The method of training for welding through virtual reality as claimed in claim 1 comprises the steps of:
- displaying a blueprint reading skill building scenario through the virtual reality headset.

10. The method of training for welding through virtual reality as claimed in claim 1 comprises the steps of:
- providing at least one weld review tool in the virtual welding environment;
- designating a welding scenario in the virtual welding environment as completed welding scenario, wherein the completed welding scenario comprises a finished weld;
- displaying the finished weld through the virtual reality headset; and
- receiving user input to review the finished weld with the at least one weld review tool.

11. The method of training for welding through virtual reality as claimed in claim 10, wherein the at least one weld review tool comprises a cross-section viewer tool.

* * * * *